United States Patent
Takebe et al.

[11] Patent Number: 5,853,779
[45] Date of Patent: Dec. 29, 1998

[54] PROCESS FOR PREPARING GRAIN PRODUCT

[75] Inventors: Minoru Takebe; Yoshio Ando, both of Tokyo; Sunao Kikushima, Kyoto, all of Japan

[73] Assignee: Nichimo Co., Ltd., Tokyo, Japan

[21] Appl. No.: 362,602

[22] PCT Filed: May 11, 1994

[86] PCT No.: PCT/JP94/00763

§ 371 Date: Feb. 23, 1995

§ 102(e) Date: Feb. 23, 1995

[87] PCT Pub. No.: WO94/26127

PCT Pub. Date: Nov. 24, 1994

[30] Foreign Application Priority Data

May 11, 1993 [JP] Japan ............................... 5-109565
Oct. 12, 1993 [JP] Japan ............................... 5-254326

[51] Int. Cl.⁶ .................................................. A23L 1/211
[52] U.S. Cl. ................... 426/20; 426/53; 426/54; 426/56; 426/60; 426/61; 426/618; 426/630; 426/635; 426/807
[58] Field of Search ........................ 426/2, 49, 53, 426/54, 56, 60, 61, 62, 331, 635, 630, 805, 807, 20, 618, 623

[56] References Cited

U.S. PATENT DOCUMENTS

| | | | |
|---|---|---|---|
| 3,655,396 | 4/1972 | Goto et al. ............................. | 426/60 |
| 3,966,971 | 6/1976 | Morehouse et al. .................... | 426/44 |
| 4,055,666 | 10/1977 | Jeffreys et al. ........................ | 426/31 |
| 4,794,014 | 12/1988 | Siren ..................................... | 426/547 |
| 4,800,093 | 1/1989 | Hogan et al. .......................... | 426/46 |
| 5,316,770 | 5/1994 | Edwards, Jr. ......................... | 424/442 |
| 5,443,979 | 8/1995 | Vanderbeke et al. .................. | 435/195 |

FOREIGN PATENT DOCUMENTS

| | | |
|---|---|---|
| A-0417481 | 3/1991 | European Pat. Off. . |
| A-2654585 | 5/1991 | France . |
| 162870 | 3/1944 | Japan . |
| S64-20090 | 1/1989 | Japan . |
| H4-23958 | 1/1992 | Japan . |
| H4-117262 | 4/1992 | Japan . |
| H4-281756 | 10/1992 | Japan . |
| A-2262213 | 6/1993 | United Kingdom . |

OTHER PUBLICATIONS

Han et al. Journal Ind. Microbiology 2 (4) 1987. pp. 195–200.
Ab. No. 57–33593 "Toshio Tanaka et al" 1982.
Ab. No. 04–325064 "Isao Moriya" Mar. 1993.
Plant Foods for Human Nutrition, vol. 42, 1992, The Netherlands, pp. 247–256, Author: J.K. Mugula: "The Nutritive Quality of Sorghum–Commonbean Tempe".
FSTA, Accession No. 84 (07) :G0529 & Miso No Kagaku To Gijutsu, No. 353, —1983, Tokyo, Japan, pp. 248–253, Author: H. Ebine: "Phytin in Foods and its Action–Miso Brewing Gets Rid of the Phytin Problem".
J. Sci. Fd Agric., vol. 28, 1977, pp. 381–383, Author: S. Sudarmadji: "The Phytate and Phytase of Soybean Tempeh".

Primary Examiner—Lien Tran
Attorney, Agent, or Firm—Koda & Androlia

[57] ABSTRACT

A process for preparing grain products to use as foods, livestock feeds, aquacultural feeds. The grains used are soybean, rice, barley, wheat, oats, rye and corn, and defatted products or brans thereof, and the like and which are extremely excellent in digestion efficiency. Conventional products made from a grain are poor in digestion efficiency, and processes for preparing such products are also poor in efficiency. One of the main features of the process resides in that phytic acid in a grain is hydrolyzed removed to obtain a product having high digestion efficiency.

8 Claims, 4 Drawing Sheets

PROCESS FOR PREPARING GRAIN PRODUCT

This application is a 371 of PCT/JP94/00763, filed May 11. 1994.

TECHNICAL FIELD

The present invention relates to a product made from a grain as a starting material, a method for using the same and a process for preparing the same.

In the present invention, the term "grain" means soybean, rice, barley, wheat, oats, rye and corn, and defatted products or brans thereof, and the like, and the term "product made from a grain" means foods, livestock feeds, aquacultural feeds and the like which are made from the above-mentioned grain.

BACKGROUND ART

Products made from a grain as a starting material are generally in great demand, and a large variety of such products are provided.

Explanation will be made with respect to products made from soybean which is one of grains or a defatted soybean. In soybean and a defatted soybean, phytic acid is contained in an amount of about 1 to 2% by weight.

Phytic acid is residually present also in a product made from soybean and inhibits activities of a vitamin B complex contained in the product to prevent absorption of minerals and the like contained in the product.

Further descriptively, phytic acid is such a compound that myo-inositol has its all hydroxyl groups each bonded with a phosphoric acid group, and chelates with a nutritionally important trace metal element to form a hardly soluble compound. Accordingly, when a food with high phytic acid content is ingested by a human being or simple-stomached animal, normal intestinal absorption of such metals, for example, calcium, magnesium. iron, zinc and the like is prevented to cause various deficiencies.

It has further been found that phytic acid present in products including an isolated soybean protein prevents a monogasteric animal from metabolically utilizing zinc in a food. Further, phytic acid is known to have inhibitory activities on various digestive enzymes in a gastrointestinal digestive tract on which ions of minerals such as calcium act as activators and which include amylase, pepsin and tripsin. It is, therefore, desired to remove phytic acid from the product.

Accordingly, there have heretofore been proposed various methods for removing phytic acid from soybean or a defatted soybean.

The conventional methods are roughly categorized as (1) ultrafiltration methods, (2) ion exchange resin methods, (3) chemical methods, and (4) enzyme treatment methods.

DISCLOSURE OF INVENTION

In the above-mentioned ultrafiltration method, however, there is a problem that peptides deposit on the surface of a filtration membrane during operation to retard filtration rate, thereby leading to decreased efficiency.

In the ion exchange resin method which comprises treating a protein-containing liquid with an ion exchange resin, there are problems of complicated operation and poor yield of protein.

In the chemical method which comprises washing soybean or a defatted soybean with an acid or alcohol, there are problems that production operation is complicated and that disposal of a large amount of waste liquor is cost-consuming and troublesome.

In the enzyme treatment method as described in Japanese Patent Unexamined Publication No.27706/1989, an enzyme is used to lower a phytic acid content, and hence a starting material such as soybean is required to be reduced to a slurry or aqueous liquid, otherwise the enzyme cannot exhibit phytic acid hydrolyzing activities. In other words, there is a problem that an enzyme cannot catalytically act on soybean or the like in the form of a solid.

Therefore, when a soybean milk which is a liquid is prepared as in the above-mentioned publication, an enzyme may be added subsequently to reduction of a starting material to a soybean milk which is a liquid, thereby causing no problem. However, when a solid product is prepared, a step of reducing a starting material to a liquid is required, and after hydrolytic treatment of phytic acid, a post-step of reduction of the liquid to a solid is further required. This results in problems of complicated preparation procedure and increased cost and the like. Further descriptively, there is a problem with respect to a solid product in that protein content is lowered due to reduction of a starting material to a liquid, and accordingly, the liquid is required to be subjected to a technically high level of concentration procedure so as to obtain a solid product with high protein content, thereby leading to extremely increased cost.

Further, there have been proposed methods utilizing phytase to hydrolytically remove phytin or to obtain a protein from soybean or a vegetable protein raw material in Japanese Patent National Publication No.503,002/1992 (Japanese Patent Application claiming priority based on U.S. patent application Ser. No. 301,563 filed on Jan. 25, 1989), Japanese Patent Publication No.29,654/1980 (Japanese Patent Application claiming priority based on U.S. patent application Ser. No. 162,654 filed on Jul. 14, 1971) and Japanese Patent Unexamined Publication No.125,300/1976 (Japanese Patent Application claiming priority based on U.S. patent application Ser. No. 538,127 filed on Jan. 2, 1975, i.e., U.S. Pat. No. 3,966,971). However, each of them has a problem such as poor production efficiency or high cost.

Further, when a product made from a grain is utilized as a livestock feed, it is nowadays regarded as indispensable to take measures for preventing environmental pollution from being caused.

In other words, excreta of livestock which contain nitrogen, phosphorus and the like in plenty have been restored as barnyard manure to farmlands. However, as chemical fertilizers have become used more and more, a large amount of phosphoric acid has accumulated in soil such as farmlands in Japan. Accordingly, pollution nuisance with excreta of livestock is not confined to particular regions of the country nowadays but has been spreading all over the country as eutrophication.

In a product made from a grain as a starting material which is used as a livestock feed, inorganic phosphoric acid is contained in a small amount, and a large part of phosphorus is present in the form of phytic acid or phytin as a salt mixture.

A ruminant animal digests phytic acid or phytin by breaking the same down to inorganic phosphorus with the aid of microorganisms present in its stomach and absorbs the inorganic phosphorus. On the other hand, however, a monogastric animal such as a pig can digest and absorb only non-phytic phosphorus. Accordingly, with respect to a monogasteric animal, an organic phosphorus in the form of phytic acid or phytin contained in a feed made from a grain as a starting material is discharged through excrement with the organic phosphorus still undigested. Further, in compensation for an indigestible and thus unabsorbable organic posphorus contained in a feed, an inorganic phosphorus such as calcium phosphate is mixed in the feed. Such an inorganic phosphorus becomes consumed in a considerably increased amount and a portion thereof is discharged through excrement, thereby causing a problem that pollution with excreta of livestock increasingly becomes severe.

Further, a rearing method has been attempted in Europe which comprises preparing phytase, which is known as an enzyme hydrolyzing phytic acid, as an isolated product, mixing the isolated product with a livestock feed made from a grain as a starting material, and feeding them together to hydrolyze phytic acid in the livestock feed by the action of the phytase in a gastrointestinal tract of livestock. In this method, however, there are problems in that expensive phytase is required as well as a livestock feed to result in increased rearing cost, and that satisfactory hydrolytic efficiency on phytic acid cannot be expected, because a livestock feed is fed with no phytic acid in a grain removed at all and then phytic acid is hydrolyzed in a livestock body by the action of phytase.

It is an object of the present invention to solve the above-mentioned problems inherent in the conventional techniques, and to provide a product made from a grain in which phytic acid contained in a grain is removed by conversion thereof into (a) form(s) readily absorbable in an animal body, which is imparted with high activities of (a) phytic acid hydrolyzing enzyme(s) to reduce an amount of phosphorus excreted through excrement of an animal, and accordingly, which is capable of effectively preventing environmental pollution with livestock excreta, which is capable of greatly reducing an amount of an inorganic phosphorus preliminarily incorporated into a feed, which is capable of eliminating addition of phytase which has heretofore been added to a grain feed, and which is capable of realizing lowered cost; and to provide a method for using such a product.

It is another object of the present invention to provide a product made from a grain in which phytic acid in a grain is readily removed to maintain a vitamin B complex contained in the product highly active, thereby facilitating absorption of minerals contained in the product, and which is capable of further promoting the absorption, and whose preparation cost is low; and to provide a process for preparing such a product.

To attain the above-mentioned object, a product made from a grain as a starting material according to the present invention is characterized in that phytic acid contained in the grain is removed by conversion thereof into (a) form(s) readily absorbable in an animal body.

A product made from a grain as a starting material according to the present invention is the product made from a grain as a starting material according to the present invention, wherein said phytic acid is removed by conversion thereof into inositol tetraphosphate, inositol triphosphate, inositol diphosphate, inositol monophosphate or inositol alone or a mixture thereof by liberating at least two phosphoric acid groups from phytic acid.

A product made from a grain as a starting material according to the present invention is characterized in that phytic acid contained in the grain is removed by conversion thereof into (a) form(s) readily absorbable in an animal body, and said product have activities of (a) phytic acid hydrolyzing enzyme(s).

A method for using a product made from a grain according to the present invention comprises:

using the product made from a grain as a starting material according to the present invention as a livestock feed.

A method for using a product made from a grain according to the present invention comprises:

using the product made from a grain as a starting material according to the present invention as a livestock feed.

A method for using a product made from a grain according to the present invention comprises:

using the product made from a grain as a starting material according to the present invention as a livestock feed.

A process for preparing a product made from a grain according to the present invention comprises:

inoculating a koji mold(starter) on a grain to effect koji preparation, thereby removing phytic acid in said grain to form said product made from a grain.

A process for preparing a product made from a grain according to the present invention is the process for preparing a product made from a grain according to the present invention, wherein at least two phosphoric acid groups are liberated from phytic acid to form inositol tetraphosphate, inositol triphosphate, inositol diphosphate, inositol monophosphate or inositol alone or a mixture thereof, thereby removing said phytic acid.

A process for preparing a product made from a grain according to the present invention comprises:

inoculating a koji mold(starter) on a grain to effect koji preparation, thereby removing phytic acid in said grain and providing activities of (a) phytic acid hydrolyzing enzyme(s) to form said product made from a grain.

A process for preparing a product made from a grain according to the present invention comprises:

inoculating a koji mold(starter) on a grain to effect koji preparation, adding water to the resultant from the koji preparation to hydrolyze a protein in the resultant in parallel with removal of phytic acid in said grain, thereby forming said product made from a grain.

A process for preparing a product made from a grain as a starting material according to the present invention is the process for preparing a product made from a grain as a starting material according to the present invention, wherein at least two phosphoric acid groups are liberated from phytic acid to form inositol tetraphosphate, inositol triphosphate, inositol diphosphate, inositol monophosphate or inositol alone or a mixture thereof, thereby removing said phytic acid.

A process for preparing a product made from a grain according to the present invention comprises:

inoculating a koji mold(starter) on a grain to effect koji preparation, adding water to the resultant from the koji preparation to hydrolyze a protein in the resultant in parallel with removal of phytic acid in said grain and with providing activities of (a) phytic acid hydrolyzing enzyme(s), thereby forming said product made from a grain.

The present invention is constructed as above, and hence it exhibits the following extremely excellent functions and effects.

In other words, according to the products made from a grain as a starting material of the present invention as claimed in the present invention, phytic acid is removed by conversion thereof into (a) form(s) readily absorbable in an animal body, specifically into such (a) form(s) that phytic acid has its at least two phosphoric acid groups liberated, such as inositol tetraphosphate, inositol triphosphate, inositol diphosphate, inositol monophosphate or inositol alone or a mixture thereof. Accordingly, phytic acid which has heretofore been impossible to be absorbed by a monogasteric animal is converted into (a) digestible and absorbable form (s) and is readily digested and absorbed.

According to the product made from a grain as a starting material as claimed in the present invention, the product per se is rendered capable of facilitating digestion and absorption of phytic acid and provided with activities of (a) phytic acid hydrolyzing enzyme(s), thereby enabling phytic acid contained in the grain to be further hydrolyzed in a gastrointestinal tract of an animal by the above-mentioned activities of (a) phytic acid hydrolyzing enzyme(s), and also enabling phytic acid contained not only in the above-mentioned product but also in a grain ingested together therewith to be hydrolyzed. Accordingly, remarkably enhanced digestion and absorption efficiency on grain is attained, and it is not required to prepare phytase as an isolated product and to mix the product in a grain, as conventionally practiced.

According to the methods for using the product made from a grain as claimed in the present invention, by virtue of the use of the products made from a grain as respectively claimed in the present invention, a livestock can efficiently digest and absorb phosphorus contained in a grain as phytic acid. Accordingly, total amount of phosphorus excreted through excreta of a livestock can be reduced, and it is not required to incorporate an inorganic phosphorus such as calcium phosphate which has heretofore been incorporated into a feed. Consequently, prevention of environmental pollution caused by excreta of a livestock is ensured.

Further, according to the method for using a product made from a grain as claimed in the present invention, by virtue of the use of the product made from a grain as a starting material according to the present invention as a livestock feed, in addition to the functions and effects of the above-mentioned methods for using the product as claimed in the present invention, phytic acid contained in the grain is further hydrolyzed by the activities of (a) phytic acid hydrolyzing enzyme(s), and phytic acid contained not only in the above-mentioned product but also in a grain ingested together therewith can also be hydrolyzed. Accordingly, remarkably enhanced digestion and absorption efficiency on grain is attained.

According to the process for preparing a product made from a grain as a starting material as claimed in the present invention, a koji mold(starter) is inoculated on the starting material to effect koji preparation, the koji mold(starter) is thereby propagated to remove phytic acid in the grain. Accordingly, if the grain may be in the form of a solid, phytic acid can be removed readily and surely in a short time.

According to the process for preparing a product made from a grain as a starting material as claimed in the present invention, a koji mold(starter) is inoculated on the starting material to effect koji preparation, and the koji mold(starter) is thereby propagated to remove phytic acid, and further, water is added to the resultant from the koji preparation treatment to hydrolyze a protein in the resultant in parallel with further thorough removal of phytic acid.

According to the process for preparing a product made from a grain as claimed in the present invention, inositol tetraphosphate, inositol triphosphate, inositol diphosphate, inositol monophosphate or inositol can be formed alone or in combination, and these have activities to facilitate absorption of a mineral contained in a grain, thereby enabling a product capable of enhanced efficiency of absorption of a mineral to be obtained.

According to the process for preparing a product made from a grain as a starting material as claimed in claim 9, a koji mold(starter) is inoculated on the starting material to effect koji preparation, and the koji mold(starter) is thereby propagated to remove phytic acid in the grain and also to provide activities of (a) phytic acid hydrolyzing enzyme(s).

Consequently, phytic acid contained in the grain is readily and surely removed in a short times, and phytic acid contained in the grain is further hydrolyzed in a gastrointestinal tract of an animal by the activities of (a) phytic acid hydrolyzing enzyme(s), and phytic acid contained not only in the above-mentioned product but also in a grain ingested together therewith can also be hydrolyzed. Accordingly, remarkably enhanced digestion and absorption efficiency on grain is attained.

According to the process for preparing a product made from a grain as a starting material as claimed in the present invention, a koji mold(starter) is inoculated on the starting material to effect koji preparation, and the koji mold(starter) is propagated to remove phytic acid and also to provide activities of (a) phytic acid hydrolyzing enzyme(s), and further, water is added to the resultant from the koji preparation to hydrolyze a protein in the resultant in parallel with further thorough removal of phytic acid and with providing superior activities of (a) phytic acid hydrolyzing enzyme(s).

The product made from a grain as a starting material and the process for preparing the same according to the present invention have such constructions and functions as described above. Therefore, effects are provided that phytic acid contained in a grain is removed by conversion thereof into (a) form(s) readily absorbable in an animal body, and the product is imparted with high activities of (a) phytic acid hydrolyzing enzyme(s) to reduce an amount of phosphorus excreted through excrement of an animal, and accordingly, the product is capable of effectively preventing environmental pollution with livestock excreta and is also capable of greatly reducing an amount of an inorganic phosphorus preliminarily incorporated into a feed, and is further capable of eliminating addition of phytase which has heretofore been added to a grain feed, and is yet capable of realizing lowered cost.

Further, the process for preparing a product made from a grain according to the present invention is capable of providing effects that phytic acid in a grain is readily removed, if the grain may be in the form of a solid, to maintain a vitamin B complex contained in the product highly active, thereby facilitating absorption of minerals contained in the product, and that the process further enables a product capable of promoting the absorption of a mineral to be obtained, and enables simplified preparation procedure and low preparation cost to be realized.

BEST MODE FOR CARRYING OUT THE INVENTION

Hereinbelow, embodiments of the present invention will be described with reference to FIGS. 1 to 4.

Figure 1:
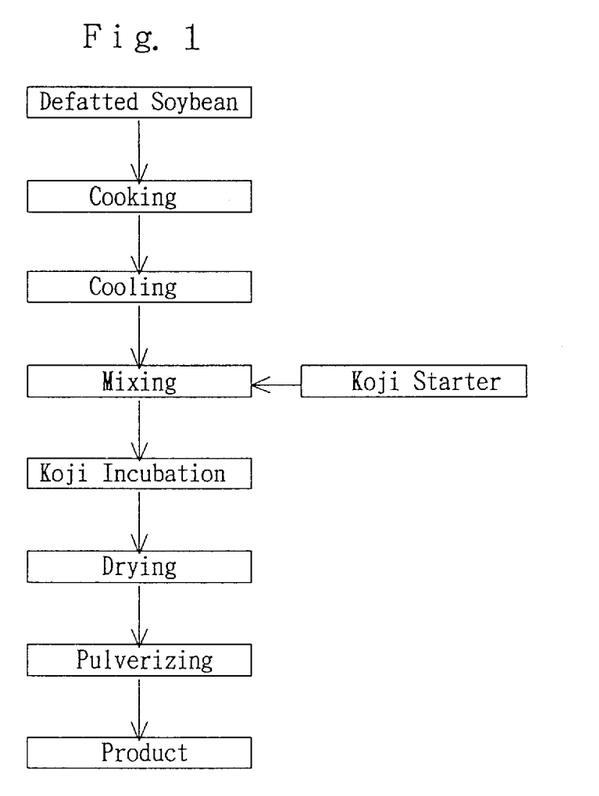
FIG. 1 is a flow chart showing one embodiment of the process for preparing a product in which phytic acid is removed in a defatted soybean in accordance with the present invention.

FIG. 1 is a flow chart showing one embodiment of the process for preparing a product subjected to removal of phytic acid in a defatted product of soybean which is one of grain in accordance with the present invention.

Explanation will be given along the lines of the procedure in FIG. 1. First, a defatted soybean is cooked. By effecting the cooking, propagation of koji is facilitated. The cooking of the defatted soybean may be conducted batchwise or continuously according to the intended product or the like.

After completion of the cooking, the defatted soybean is once cooled to adjust water content of the defatted soybean to a level allowing koji to propagate (for example 40% by weight).

The defatted soybean thus adjusted in the water content is subjected to the process of the present invention as follows.

That is, the defatted soybean already cooked is inoculated with a koji starter of a koji mold at a predetermined weight ratio, and mixing is conducted to uniformness.

Then, the mixture is charged into a device for preparing koji and kept in a heated condition at 28° to 30° C. for a predetermined period of time to ferment the defatted soybean having a water content as low as 40% by weight with koji. The koji preparation is continued until phytic acid level in the defatted soybean is sufficiently reduced.

In this case, koji is propagated on the defatted soybean to produce phytase and phosphatase which are enzymes hydrolyzing phytic acid, and by the enzymes, phytic acid is removed by hydrolysis.

In other words, from phytic acid which is such a compound that myo-inositol has all its hydroxyl groups each bonded with a phosphoric acid group, the phytic acid hydrolyzing enzymes liberate the above-mentioned phosphoric acid group(s) to form inositol pentaphosphate, inositol tetraphosphate, inositol triphosphate, inositol diphosphate, inositol monophosphate or inositol alone or a mixture thereof, thereby removing the above-mentioned phytic acid.

Further, in this embodiment, phytic acid hydrolyzing enzymes of phytase and phosphatase are produced in the defatted soybean, thereby enabling a product having very high phytic acid hydrolyzing enzyme activities to be attained. This enables phytic acid contained in a grain to be further hydrolyzed in a gastrointestinal tract of an animal by the above-mentioned phytic acid hydrolyzing activities, and also enables phytic acid contained not only in the above-mentioned product but also in a grain ingested together therewith to be hydrolyzed. Accordingly, remarkably enhanced digestion and absorption efficiency on grain is attained, and it is not required to conventionally prepare phytase as an isolated product and mix the same in a grain.

As the koji for the koji preparation, there may be used koji mold(starter)s which are used in preparation of fermented foods peculiar to Japan and tempeh and which are safely used for foods, for example, those having high phytase and phosphatase potencies and classified as Aspergillus genus such as *Aspergillus usamii, Aspergillus kawachii, Aspergillus awamori, Aspergillus saitoi, Aspergillus oryzae* and *Aspergillus niger;* and those having high phytase and phosphatase potencies and classified as Rhizopus genus.

The fermentation time depends upon the type of koji used. However, it is at least 24 hours and is appropriately selected to be sufficient one for removing phytic acid to a satisfactory extent.

Figure 2:
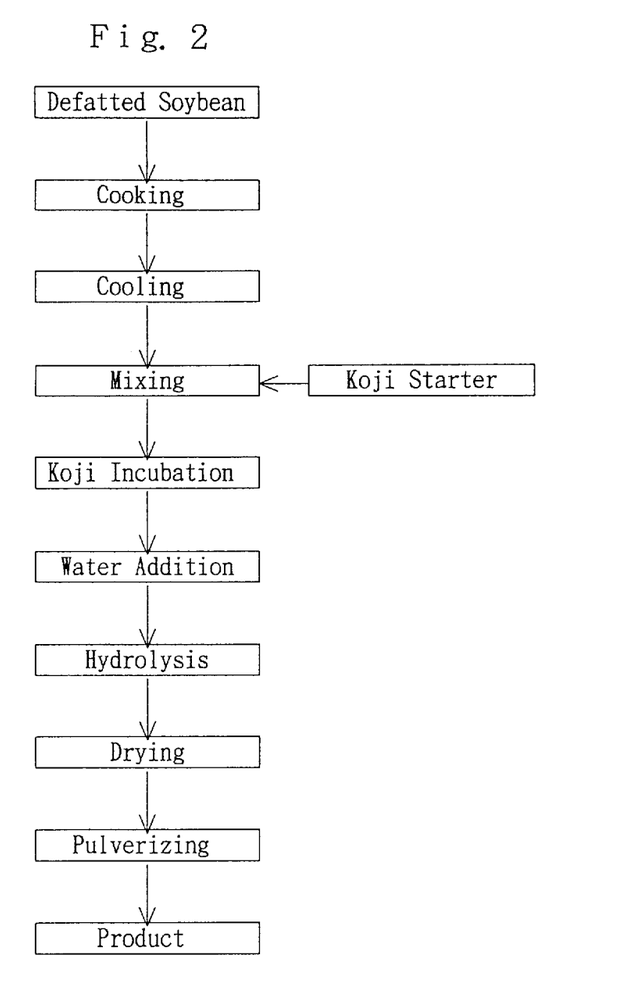
FIG. 2 is a flow chart showing another embodiment of the process for preparing a product in which phytic acid is removed in a defatted soybean in accordance with the present invention.

FIG. 2 is a flow chart showing another embodiment of the process for preparing a product subjected to removal of phytic acid in a defatted product of soybean which is one of grain in accordance with the present invention.

In this embodiment, a protein is hydrolyzed in parallel with further thorough removal of phytic acid.

In other words, in this embodiment, the steps up to the koji preparation are conducted in the same manner as in the previous embodiment, and after completion of the koji preparation, water is added to the resulting product, and then the mixture is kept in a heated condition at 30° to 65° C. for a predetermined period of time to sufficiently reduce the level of phytic acid contained in the defatted soybean by the hydrolytic activities of phytase and phosphatase while generating phytic acid hydrolyzing enzymes of phytase and phosphatase in the defatted soybean in parallel with hydrolysis of protein.

With respect to the hydrolysis of protein, hydrolysis time and hydrolysis temperature is appropriately selected depending upon the type of koji used so that phytic acid in the defatted soybean is sufficiently removed.

According to the process of the latter embodiment, organic acids are formed in the initial stage of the fermentation to inhibit contaminants from propagating in the defatted soybean, thereby eliminating undesired possibility of secondary contamination. Consequently, a product made from a defatted soybean as a starting material can be mass-produced. Further, even if the water content is not low, satisfactory phytic acid removing treatment can be effected.

The removal of phytic acid is effected by liberating at least one phosphoric acid group from phytic acid which is inositol hexaphosphate. In this connection, however, at least two phosphoric acid group-liberated resultants, i.e., inositol tetraphosphate, inositol triphosphate, inositol diphosphate, inositol monophosphate and inositol are water-soluble and have activities to greatly facilitate absorption of a mineral such as calcium contained in a product made from a cereal.

Further descriptively, the above-mentioned inositol hexaphosphate and inositol pentaphosphate have strong ion capturing activities and prevent captured ion from being liberated, thereby strongly inhibiting absorption of calcium. On the other hand, inositol tetraphosphate to inositol have such preferable affinities that they preferably capture calcium but readily liberate captured calcium on occasion, thereby exhibiting characteristic activities to facilitate absorption of calcium as mentioned above. With interest in this point, the aspect of the present invention according to claim 8 or 11 resides in that a product which enables minerals to be absorbed efficiently is obtained by liberating at least two phosphoric acid groups from phytic acid to form inositol tetraphosphate, inositol triphosphate, inositol diphosphate, inositol monophosphate or inositol alone or a mixture thereof for removal of phytic acid. In this case, according to the aspect of the invention as claimed in claim 7 or 10, it is preferred to control the number of the phosphoric acid groups liberated from phytic acid by adjusting the fermentation time, and hydrolysis time and hydrolysis temperature depending upon the type, state, properties and amount of the grain, the type, state, properties and amount of koji, and type and properties of the intended product.

Table 1 shows phytic acid content in 100 g of a defatted soybean, with respect to an untreated defatted soybean; defatted soybeans A and B which are prepared, in accordance with the process of the present invention as claimed in claim 7, by using two different shochu kojis, for example, Aspergillus niger and Aspergillus awamori, respectively, and each prepared by subjecting a defatted soybean to koji preparation at 30° C. for 48 hours; defatted soybeans Aa and Ba prepared, in accordance with the process of the present invention as claimed in claim 10, by adding water to the above-mentioned products A and B in the same weight as that of the products, respectively, and further subjecting the resultants to hydrolysis of protein at 50° C. for 48 hours; and a defatted soybean subjected to conventional washing treatment with an alcohol.

TABLE 1

| defatted soybean | phytic acid content |
|---|---|
| untreated defatted soybean | 999 (mg/100 g) |
| shochu koji-treated d. s. A | 366 (mg/100 g) |
| shochu koji-treated d. s. Aa | not detected |
| shochu koji-treated d. s. B | 358 (mg/100 g) |
| shochu koji-treated d. s. Ba | not detected |
| alcohol-washed d. s. | 1,150 (mg/100 g) |

(detection limit: 5 mg/100 g)

According to Table 1, as compared with the phytic acid content of 999 mg, i.e., about 1% in the untreated defatted soybean, phytic acid contents in the defatted soybeans A and B subjected to the shochu koji treatment in accordance with the process of the present invention are 366 mg and 358 mg, respectively, each of which is a bit greater than ⅓ of the phytic acid content in the untreated defatted soybean, it is thereby understood that greatly reduced phytic acid contents are realized. Further, in each of the defatted soybeans Aa and Ba which are prepared in accordance with the process of the present invention by adding water to the above-mentioned defatted soybeans A and B in the same weight as those of the products, respectively, and further subjecting the mixtures to hydrolysis of protein at 50° C. for 48 hours, no substantial phytic acid content is detected. In other words, phytic acid content is reduced to such a level that almost all phytic acid has been hydrolyzed.

On the other hand, the phytic acid content in the defatted soybean subjected to the conventional washing treatment with an alcohol is 1,150 mg and no reduction of the phytic acid content is observed at all.

Figure 3:
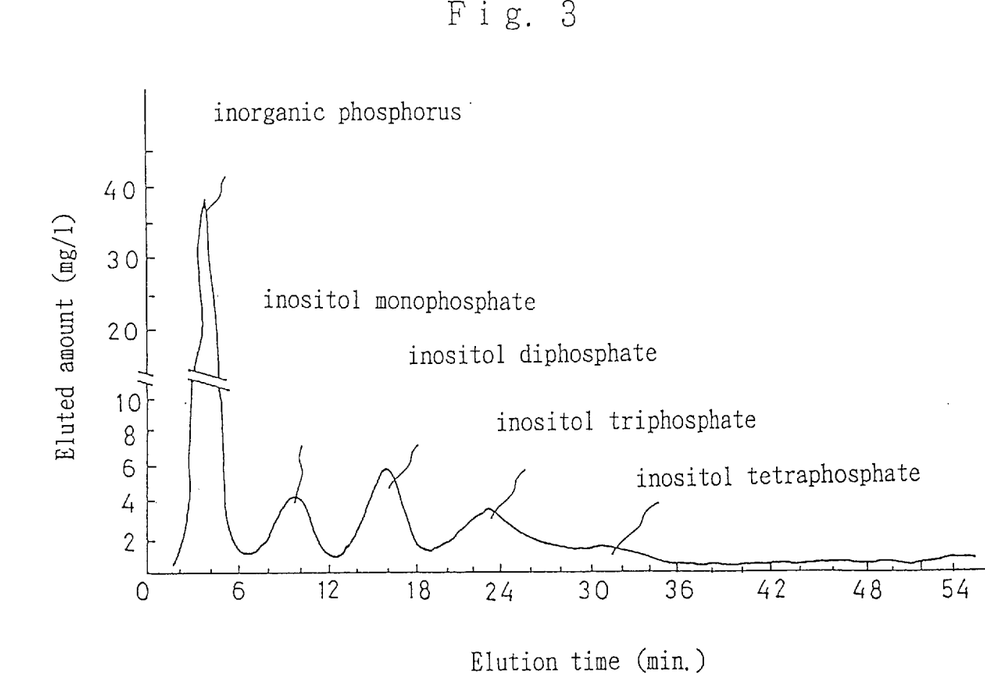
FIG. 3 is a characteristic representation showing a chromatographic elution pattern of phytic acid hydrolysates with respect to a product in which phytic acid is removed in a defatted soybean in accordance with the present invention.
Figure 4:
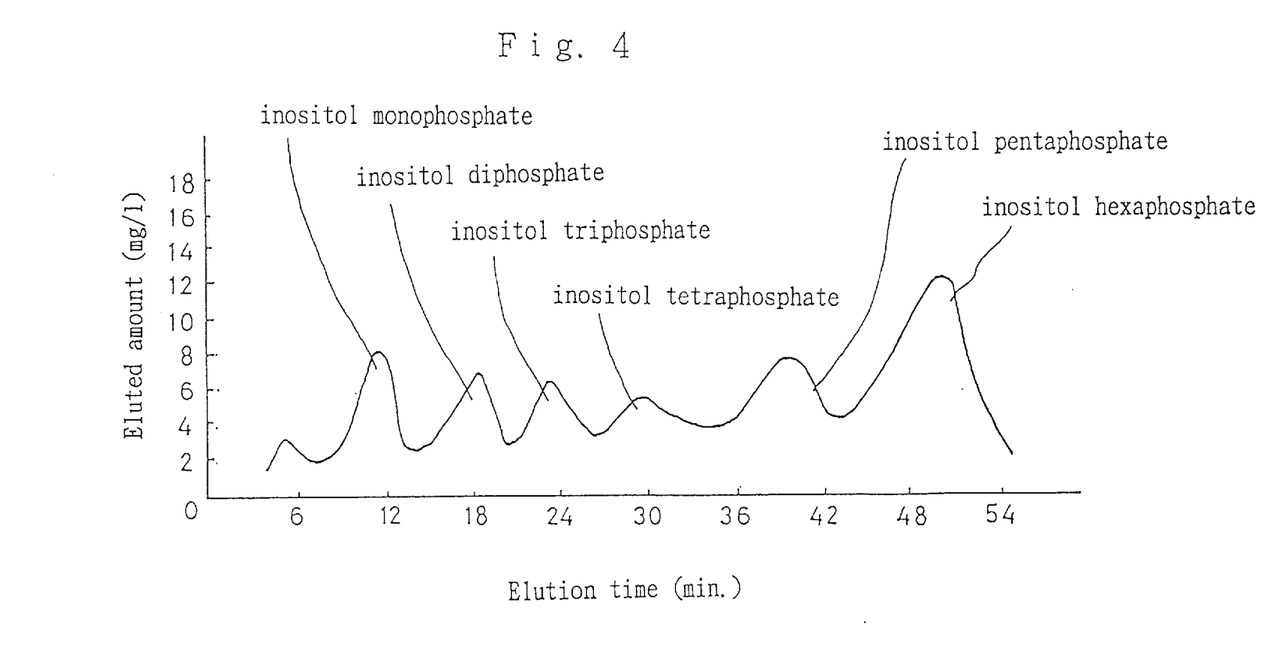
FIG. 4 is a characteristic representation showing a chromatographic elution pattern of phytic acid hydrolysates with respect to a product in which phytic acid is removed in an untreated defatted soybean.

Upon separation by means of ion exchange chromatography with respect to the defatted soybean A according to the present invention and the conventional untreated defatted soybean, a chromatographic elution pattern of hydrolysates from phytic acid shown in FIG. 3 was obtained for the defatted soybean A according to the present invention, and a chromatographic elution pattern of hydrolysates from phytic acid shown in FIG. 4 was obtained.

Upon comparison between FIG. 3 and FIG. 4, with respect to the defatted soybean A according the present invention, it is seen that inositol tetraphosphate, inositol triphosphate, inositol diphosphate, inositol monophosphate and an inorganic phosphorus are eluted which have activities to greatly facilitate absorption of a mineral such as calcium contained in a product made from a grain as a starting material, but no substantial inositol pentaphosphate and phytic acid are eluted which inhibit absorption of a mineral; and the defatted soybean is thus understood to be such that a vitamin B complex having growth promoting activities and antiadipohepatic activities and such useful like which are contained in the defatted soybean are maintained highly active to enable a mineral and the like contained in the defatted soybean to be readily absorbed. Of these eluates, the inorganic phosphorus, which is a resultant from conversion of an organic phosphorus into an inorganic phosphorus and is eluted, is advantageously readily absorbed in a body to enable phosphorus which is a nutrient contained in a defatted soybean to be absorbed in a body, thereby realizing a nutrititively enhanced product as a food, livestock feed and the like.

On the other hand, with respect to the conventional untreated defatted soybean, it is seen that inositol pentaphosphate and phytic acid which inhibit absorption of a mineral are eluted as well as inositol tetraphosphate, inositol triphosphate, inositol diphosphate and inositol monophosphate; and the untreated defatted soybean is thus understood to be very poor in absorption efficiency of a mineral as compared with the defatted soybean A ccording to the present invention.

The defatted soybean thus having its phytic acid level greatly or almost completely reduced in accordance with the present invention is such a defatted soybean that a vitamin B complex having growth promoting activities and antiadipohepatic activities and such useful like which are contained in the defatted soybean are maintained highly active to enable a mineral and the like contained in the defatted soybean to be readily absorbed.

When the thus prepared defatted soybean is utilized as a feed or the like, as shown in FIGS. 1 and 2, the defatted soybean prepared as in each of the above-mentioned embodiments is dried and then pulverized to obtain a product such as a material for a livestock feed or an aquacultural feed as a pulverized defatted soybean from which phytic acid is substantially removed.

As described above, according to the present invention, removal of phytic acid in a grain and hydrolysis of protein are effected by propagation of living koji. Accordingly, phytic acid is readily removed if the grain may be in a solid state or liquid state, thereby enabling simplified preparation procedure and reduced preparation cost to be realized.

Therefore, according to the present invention, it is ensured that the following problem involved in preparation of a solid product by a conventional method can be solved, i.e., is surely solved a problem that a step for converting a starting material into a liquid form is required and a post-step for reducing the liquid to a solid form is also required subsequently to phytic acid hydrolyzing treatment, thereby leading to complicated preparation procedure and increased cost.

Further, by virtue of the removal of phytic acid by liberating at least two phosphoric acid groups from phytic acid, a product exhibiting improved mineral absorption efficiency can be obtained.

Further, in the process of the present invention according to claim 9 or 12 for preparing a product from a grain as a starting material, attention is given to the fact that koji preparation and subsequent hydrolysis is conducted by inoculating koji mold(starter) on the starting material, and the koji mold(starter) is thereby propagated to remove phytic acid in the grain and to enhance activities of phytic acid hydrolyzing enzymes. In other words, according to this embodiment, phytic acid hydrolyzing enzymes of phytase and phosphatase are generated, thereby enabling phytic acid in the grain to be readily and reliably removed in a short time, and also enabling phytic acid contained in the grain to be further hydrolyzed in a gastrointestinal tract of an animal by the above-mentioned phytic acid hydrolyzing activities, and further enabling phytic acid contained not only in the above-mentioned product but also in a grain ingested together therewith to be hydrolyzed. Accordingly, remarkably enhanced digestion and absorption efficiency on grain is attained.

In the next place, by the following experiments, explanation will be given with respect to influence of excreta of livestock on the environment when the product made from a grain of the present invention prepared as described above is fed to livestock as a livestock feed.

Contents of Experiment 30 male rats of 7 weeks old as test animals were divided into 5 experimental divisions (defatted soybean division, A division, B division, C division, D division) and fed with formula feeds shown in Table 2, respectively. During 5 days after a lapse of a week from initiation of feeding of the formula feeds, excreta are collected to examine digestional degree and increase of a body weight with respect to each of rats.

TABLE 2 feed formulation (% by weight)

| | d.s. div. | A div. | B div. | C div. | D div. |
|---|---|---|---|---|---|
| defatted soybean | 40 | 0 | 0 | 0 | 0 |
| treated defatted soybean | 0 | 40 | 40 | 40 | 40[c)] |
| methionine | 0.3 | 0.3 | 0.3 | 0.3 | 0.3 |
| sucrose | 50.6 | 50.6 | 50.6 | 50.6 | 50.6 |
| corn oil | 5 | 5 | 5 | 5 | 5 |
| cellulose | 0.5 | 0.5 | 0.5 | 0.5 | 0.5 |
| mixed vitamin | 2 | 2 | 2 | 2 | 2 |
| mixed mineral[a)] | 3.5 | 3.5 | 3.5 | 3.5 | 3.5 |
| calcium carbonate | 1.5 | 1.5 | 1.5 | 1.5 | 1.5 |
| sodium dihydrogenphosphate | 1.6 | 1.6 | 1.6 | 1.6 | 1.6 |
| sodium phytate | 0 | 0 | 0 | 0 | 0.55 |
| choline chloride | 0.1 | 0.1 | 0.1 | 0.1 | 0.1 |
| PEG | 1 | 1 | 1 | 1 | 1 |
| calcium | 0.69 | 0.69 | 0.69 | 0.69 | 0.69 |
| phosphorus | 0.57 | 0.57 | 0.57 | 0.57 | 0.57 |
| phytic acid | 0.40[b)] | 0 | 0 | 0 | 0.39 |

[a)] AIN-76, no calcium nor phosphorus
[b)] analysis by means of precipitation method
[c)] the same one as A division

TABLE 3 content of phytic acid hydrolysates in treated defatted soybean (µmol/g)

| Division | 1P | 2P | 3P | 4P | 5P | 6P |
|---|---|---|---|---|---|---|
| defatted soybean | 0.39 | 0.48 | 0.47 | 1.42 | 1.58 | 8.81 |
| A | 13.9 | 1.33 | 0.33 | slight | slight | slight |
| B | 5.95 | 3.20 | 1.81 | 0.31 | 0.67 | 0.85 |
| C | 8.45 | 2.21 | 1.12 | 0.15 | 0.39 | 0.44 |

TABLE 4 phytase activities (unit[a)]/g)

| defatted soybean | A | B | C |
|---|---|---|---|
| slight | 167.7 | 196.8 | 151.6 |

[a)] nmol phosphorus generation/min.

In Table 2, the defatted soybean fed to the defatted soybean division is untreated one containing phytic acid, and the treated defatted soybeans fed to the other divisions are the above-mentioned defatted soybeans which are prepared in accordance with the present invention and from which phytic acid is removed. The treated defatted soybean for A division is one subjected to koji preparation for 48 hours and hydrolysis for 12 hours, the treated defatted soybean for B division is one subjected to koji preparation for 48 hours and hydrolysis for 3 hours, the treated defatted soybean for C division is one subjected to koji preparation for 48 hours and hydrolysis for 1 hour, and the treated defatted soybean for D division is the same one as the treated defatted soybean for A division. With respect to each of the defatted soybean and the treated defatted soybeans for these divisions, contents of phytic acid hydrolysates are as shown in Table 3 and phytase activities are as shown in Table 4. The formula feed fed to D division is prepared by incorporating sodium phytase into the formula feed fed to A division with its sodium dihydrogenphosphate content decreased. In Table 2, contents of calcium (Ca), phosphorus (P) and phytic acid in the formula feeds are also shown in the bottom section.

Digestional degree and increase in a body weight in each of the divisions are as shown in Table 5.

TABLE 5 digestion degree and body weight increase

| | d.s. div. | A div. | B div. | C div. | D div. |
|---|---|---|---|---|---|
| ingested amount of dry matter (g/day) | 22.9 ± 0.7 | 22.1 ± 0.5 | 23.5 ± 0.3 | 21.8 ± 0.7 | 24.1 ± 0.4 |
| amount of dry matter through excrement (g/day) | 2.09 ± 0.07 | 2.94 ± 0.16 | 3.19 ± 0.13 | 3.21 ± 0.13 | 2.52 ± 0.16 |
| digestion degree (%) | 90.9 ± 0.1 | 86.7 ± 0.6 | 86.4 ± 0.4 | 84.8 ± 0.2 | 89.5 ± 0.7 |
| ingested amount of phosphorus (mg/day) | 103.6 ± 3.0 | 81.8 ± 1.7 | 93.8 ± 1.3 | 87.2 ± 3.0 | 110.7 ± 1.7 |
| amount of phosphorus through excrement (mg/day) | 38.5 ± 1.1 | 16.3 ± 1.4 | 18.5 ± 1.8 | 19.3 ± 0.3 | 14.3 ± 0.6 |
| absorption degree of phosphorus (%) | 62.8 ± 1.2 | 80.1 ± 1.5 | 80.4 ± 1.6 | 77.8 ± 0.5 | 86.5 ± 0.2 |
| body weight increase (g/14 days) | 185.6 ± 5.7 | 173.3 ± 5.7 | 196.6 ± 6.8 | 173.7 ± 9.0 | 184.1 ± 9.1 |

In Table 5, with respect to each of the rats, the digestional degree is determined from the ingested amount of a dry matter of the formula feed and the amount of excrement, the ingested amount of phosphorus is determined from the above-mentioned ingested amount of a dry matter, the excreted amount of phosphorus through excrement is determined from the above-mentioned amount of excrement, and the absorption degree of phosphorus is determined from the ingested amount of phosphorus and the excreted amount of phosphorus through excrement.

It is seen from Table 5 that, in contrast to the average excreted amount of phosphorus through excrement of 38.5 mg/day with respect to the defatted soybean division fed with the untreated defatted soybean, the averages of the excreted amounts of phosphorus through excrement are 16.3 mg/day, 18.5 mg/day, 19.3 mg/day and 14.3 mg/day with respect to A division, B division, C division and D division which are fed with the treated defatted soybeans prepared in accordance with the present invention, respectively, i.e., a half or less of the value in the defatted soybean division is realized. Consequently, also in the absorption degree of phosphorus, A division, B division, C division and D division which are fed with treated defatted soybeans prepared in accordance with the present invention are improved by 15 to 24% as compared with the defatted soybean division fed with the untreated soybean.

It is understood from this that when the product made from a grain as a starting material according to the present invention is used as a livestock feed, phytic acid contained in a grain is converted into (a) form(s) readily absorbable in an animal body, specifically, into such (a) form(s) that phytic acid has its at least two phosphoric acid groups liberated, i.e., inositol tetraphosphate, inositol triphosphate, inositol diphosphate, inositol monophosphate or inositol alone or a mixture thereof, and consequently removed, and as a result, phytic acid which has heretofore been impossible to be digested and absorbed by a monogastric animal is converted into (a) digestible and absorbable form(s) and sufficiently digested and absorbed. Further, from phosphorus contained in a grain as phytic acid, a livestock efficiently digests and absorbs phosphorus at least in an amount required for satisfactorily rearing a livestock. Accordingly, total amount of phosphorus excreted through excreta of a livestock can be reduced greatly, and it is not required to incorporate an inorganic phosphorus such as calcium phosphate which has heretofore been incorporated into a feed. Consequently, prevention of environmental pollution caused by excreta of a livestock is ensured, and cost for a livestock feed can be reduced.

Further, in this Experimental Example, as shown in Table 4, phytase activities, i.e., activities of a phytic acid hydrolyzing enzyme are remarkably enhanced in A division, B division and C division fed with the treated defatted soybeans prepared in accordance with the present invention, as compared with those in the defatted soybean division fed with the untreated defatted soybean. Accordingly, in the Experimental Example, phytic acid contained in a grain is further hydrolyzed in a gastrointestinal tract of each rat by virtue of the phytase activities, and it is understood that, as shown in Table 5, absorption degrees of phosphorus in A division, B division and C division are extremely superior to that in the defatted soybean division. In this connection, as shown in Table 5, by the incorporation of sodium phytate into the formula feed in D division, the sodium phytate is decomposed in the course of digestion to exhibit activities comparable to those of the enzyme such as phytase, thereby realizing the excreted amount of phosphorus through excreta and the absorption degree of phosphorus superior to those in the other A division, B division and C division. It is, therefore, understood that phytic acid contained in a grain is further hydrolyzed in a gastrointestinal tract of each rat by virtue of the phytase activities, i.e., activities of a phytic acid hydrolyzing enzyme. Therefore, according to this Experimental Example, it is possible to hydrolyze phytic acid contained not only in the product made from a grain by koji preparation treatment and hydrolysis treatment but also in a grain ingested together with the product in a gastrointestinal tract of an animal, thereby enabling considerably enhanced digestion and absorption efficiency of a grain. Accordingly, it is not required to conventionally prepare phytase as an isolated product and to mix the same in a grain. In particular, in the case of animals fed with various grains as a feed such as a pig, by incorporating the treated defatted soybean of the Experimental Example into the feed, it is possible to considerably enhance digestion and absorption efficiency of the grains in the feed, and in turn possible to reduce an amount of phosphorus excreted through excrement of the animal to effectively prevent environmental pollution with livestock excreta. It is further possible to greatly reduce an amount of inorganic phosphorus preliminarily incorporated into the feed, and also possible addition of phytase which has heretofore been added to a grain feed to realize reduced cost.

It is to be noted that although in each of the above-described embodiments is given the case where the present invention is applied to a defatted soybean, the present invention can likewise be applied to any products made from a grain as a starting material which contains phytic acid, i.e., those ranging from foods for a human being to cultural and aquacultural feeds.

Further, the present invention can be carried out using a conventional device for preparing koji without any alteration, and hence a basic device for production is not required to be specially manufactured, thereby providing wide utility.

It is to be noted that the present invention is by no means restricted to the above-described embodiments and that various alterations and modifications can be made according to need.

We claim:

1. A process for preparing a grain food product comprising the steps of:

a. cooking grains, b. cooling said cooked grains, c. inoculating a koji mold on said grains as a starting material and incubating said grain containing said koji mold for a period of time sufficient to cause hydrolysis of phytic acid by enzymes secreted from said koji mold to form a koji mold grain preparation, d. adding water into said koji mold grain preparation, e. keeping said koji mold grain preparation at 30°–65° C. for a period of time until hydrolysis of remaining phytic acid is substantially completed and f. drying said koji mold grain preparation to produce said grain food product.

2. The process for preparing a grain food product according to claim 1, wherein at least two phosphoric acid groups are liberated from phytic acid to form inositol tetraphosphate, inositol triphsphate, inositol diphosphate, inositol monophosphate or inositol alone or a mixture thereof during hydrolysis of said phytic acid by said preparation, thereby removing phytic acid from said grains.

3. A process as in claim 1, further comprising the step of pulverizing said koji mold grain preparation into said grain food product after said step of drying said koji mold grain preparation.

4. A process as in claim 1, wherein said step of keeping said koji mold grain preparation at 30°–65° C. is carried out for 48 hours.

5. A process for preparing of a grain food product comprising the steps of:

a. cooking grains;

b. cooling said grains;

c. inoculating a koji mold on said grains as a starting material to initiate hydrolysis of phytic acid by enzymes secreted from said koji mold to form a koji mold grain preparation;

d. fermenting said koji mold grain preparation for a period of time sufficient to reduce the level of phytic acid;

e. adding water into said fermented koji mold grain preparation;

f. keeping said fermented koji mold grain preparation at 30°–65° C. for a period of time until hydrolysis of remaining phytic acid is substantially completed;

g. drying said fermented koji mold grain preparation after said phytic acid remaining in said grain preparation is removed; and h. pulverizing said dried fermented koji mold grain preparation to form said grain food product.

6. A process as in claim 5, wherein the step of drying said fermented koji mold grain preparation is carried out when no substantial quantity of phytic acid remains in said grain preparation.

7. A process as in claim 5, wherein said dried fermented koji mold grain preparation contains substantially no phytic acid.

8. A process as in claim 5, wherein said step of fermenting said koji mold preparation is carried out for at least 24 hours.

\* \* \* \* \*